Dec. 4, 1956  O. W. HOSKING  2,772,714
RUBBER VALVE STEM
Filed Feb. 26, 1953

INVENTOR
Oakley W. Hosking
BY Johnson and Kline
ATTORNEYS

United States Patent Office 2,772,714
Patented Dec. 4, 1956

2,772,714

RUBBER VALVE STEM

Oakley W. Hosking, Monroe, N. Y.

Application February 26, 1953, Serial No. 339,127

2 Claims. (Cl. 152—430)

This invention relates to rubber valve stems and more particularly to composite valve stems formed of resilient rubber and rigid nonrubber parts, as used in tires, tubes and the like.

An object of the invention is to provide an improved composite valve stem which is extremely simple in its construction and economical to fabricate while at the same time being durable, corrosion resistant and able to withstand rough usage.

Another object of the invention is to provide an improved valve stem as above set forth, in which the resilient rubber portion and the rigid nonrubber portion are securely attached to each other and prevented from separating, and which is leakproof at all times, even under severe conditions of use.

A still further object of the invention is to provide an improved rubber valve stem in accordance with the above, which is extremely compact and light in weight, adapting it especially for aircraft use.

In accomplishing the above objects I provide a novel valve stem structure comprising an elongate tubular rubber body having embedded in its walls and coaxial therewith a rigid tubular member formed of molded plastic, preferably "nylon" (synthetic fiber-forming polymeric amide). The rigid tubular member has a projecting threaded neck portion into which the valve inside is threaded and on which the valve cap is screwed, and has a body portion comprising a tapered collar and a cylindrical anchorage portion projecting axially from the collar. The cylindrical anchorage portion has outwardly radially extended fins or flanges which strengthen it mechanically and make it failure-resistant, said flanges and anchorage portion being substantially wholly imbedded in and enclosed by the rubber body of the valve stem.

Preferably the radial flanges and cylindrical anchorage portion are perforated or apertured to enable the rubber of the body to extend through said parts and provide a secure interlock between the rubber body and the rigid tubular member. The organization is such that fluid pressure on the inside of the tubular rubber body will tend to expand the inner portion thereof and press it outwardly against the cylindrical anchorage portion, thereby to effect a tighter seal as the pressure is increased. Accordingly dependence is not had on a bond being established between the rubber and the rigid member, but instead these parts are secured together by virtue of their specific shapes and interlocking engagement.

Other features and advantages will hereinafter appear.

Figure 1:
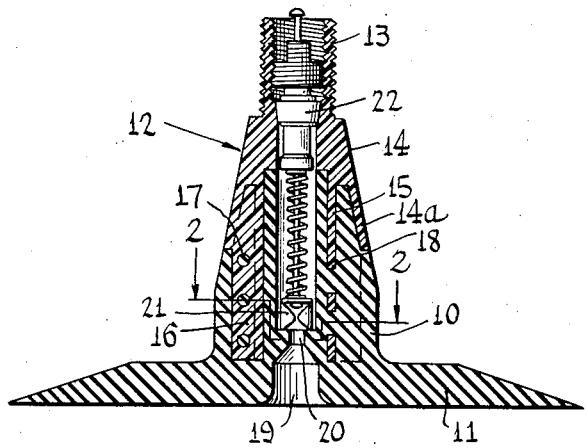
Figure 1 is a vertical axial sectional view, enlarged, of a valve stem made in accordance with the invention.

Referring to the drawings, the improved valve stem of this invention comprises a tubular rubber body 10 having an integral base flange 11 by means of which it may be cemented or vulcanized to an inner tube or other part which is to have the valve.

Imbedded in the body 10 is a rigid tubular member 12 which is formed of molded plastic such as nylon, the member 12 being coaxial with the body 10 and having an externally and internally threaded neck portion 13, a frusto-conical or tapered collar portion 14 provided with a flared skirt 14a, and a substantially cylindrical anchorage portion 15, the latter having longitudinally extending radial flanges or fins 16 by which it is greatly strengthened.

The anchorage portion 15 of the member 12 extends into the skirt 14a and is joined to the lower end of the collar 14. The radial flanges 16 also extend into the skirt 14a and are joined to the inner walls of the skirt.

Preferably, for the purpose of providing a secure interlock between the tubular member 12 and the rubber body 10, the flanges 16 are provided with apertures 17, and the anchorage portion 15 provided with apertures 18 to enable the rubber of the body to flow into and occupy the space in the apertures. The tubular member 12 may be readily molded in the shape shown, except for the apertures 17 and 18, and these may be later punched in the member by suitable tools after it has been removed from the molding die. After molding and punching the member 12 I prefer to color it, as by dipping the member into a hot dye bath, or a series of baths, in order to improve the overall appearance of the valve stem. For example, the member may first be dipped in a red dye bath to color the neck portion 13, collar 14 and skirt 14a. Thereafter, the member may be dipped into a black dye bath to color the anchorage portion 15 and also the skirt 14a, the black dye being dominant and hiding the previous red coloring which was imparted to the skirt. A fairly sharp line of demarcation may in this manner be easily established between the colors, at the zone where the skirt 14a joins the collar 14 without great care being required in the red coloring operation. The advantage of so coloring the member 12 will be brought out later in detail.

I have found that the apertures 17 and 18 may be advantageously punched after the dyeing operation, said punching being facilitated by the heat imparted to the member 12 in the dye bath.

Figure 2:
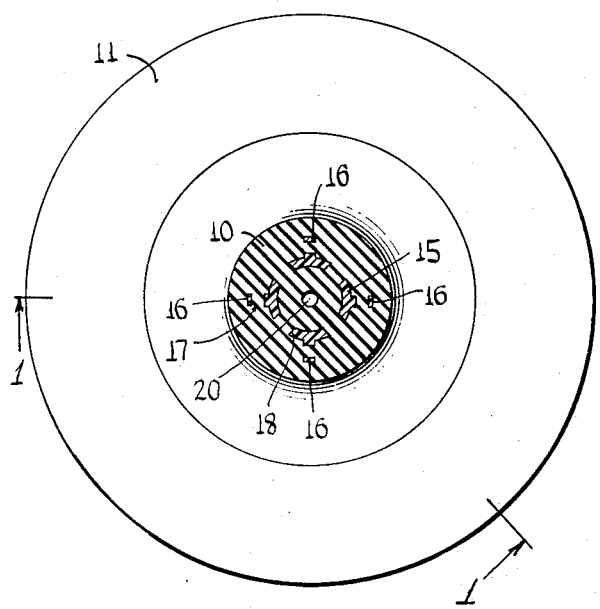
Fig. 2 is a view partly in plan and partly in horizontal section, taken on line 2—2 of Fig. 1, the section of Fig. 1 being taken on the line 1—1 of Fig. 2.
Figure 4:
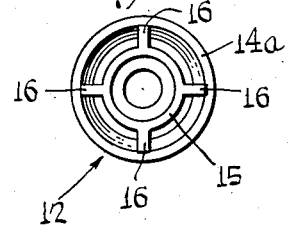
Fig. 4 is a bottom view of the insert of Fig. 3.

After the member 12 has been fabricated as above, it is placed in a suitable mold and the rubber body 10 molded about it, as shown in Figs. 1 and 2. The rubber of the body will occupy the hollow of the skirt 14a, and will occupy all of the apertures 17 and 18. The anchorage portion 15 and flanges 16 thereof will therefore be wholly surrounded and concealed by the rubber of the body 10.

Referring to Fig. 1 the bore 19 of the body 10 is provided with a constriction 20 to provide an abutment for engagement with the shoe 21 of a valve inside 22 which may be threaded into the neck 13 of the valve stem.

I have found that by the above construction an economical, sturdy and durable valve stem is provided which is corrosion resistant, light in weight, compact and leakproof even though no actual bond exists between the rubber and the rigid member 12.

Fluid pressure within the bore of the rubber body 10 will tend to expand the inner wall portions of said body, and press the same outward against the inside of the anchorage portion 15 of the member 12. This action, together with the interlock provided by the rubber occupying the apertures 17 and 18, results in the rubber body 10 being securely fastened to the member 12 and providing a leakproof seal therewith. The greater the fluid pressure in the bore of the rubber body, the more forcibly the rubber will be held against the inside of the part 15 and the greater the resistance which will be offered to leakage of fluid between the two parts.

Figure 3:
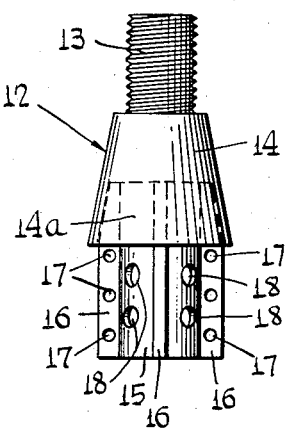
Fig. 3 is an elevational view of the rigid tubular insert member of the valve stem.

An advantageous proportion of the parts for the size of valve stem illustrated is shown in Figs. 1 and 3, wherein the anchorage portion 15 is approximately 50 percent longer than the combined lengths of the collar 14 and skirt 14a, these latter being approximately of equal lengths. By this construction adequate strength and sealing of the parts to each other is obtained.

Where black rubber is to be used for the body 10 it is advantageous to have the skirt 14a opaque, as by dyeing it black, since this will hide the fins 16 and also tend to mask the dividing line between the rubber body and the skirt, thereby improving the appearance of the valve stem. The coloring of the collar 14 and neck 13 may be chosen to suit various conditions or requirements encountered as for example, when matching the color scheme of the car, etc.

Variations and modifications may be made within the scope of the claims and portions of the improvements may be used without others.

I claim:

1. In a valve stem, an elongate tubular resilient rubber body having imbedded in its walls and coaxial therewith a rigid tubular member, said member having a neck projecting beyond the body for receiving a valve inside and having an anchorage portion comprising a tubular section provided on its outer peripheral surface with longitudinal outwardly radially extending fins joined with said neck, said tubular section and fins being completely enclosed on their inside, outside and one end by said rubber body in which the neck portion of the tubular member includes a tapered collar connected to the anchorage portion, said collar having a skirt surrounding a part of the anchorage portion and fins and secured to the latter, the rubber of the body occupying the space inside said skirt.

2. The invention as defined in claim 1 in which the length of the anchorage portion is approximately 50 percent greater than the combined length of the collar portion and skirt, said collar portion and skirt being of substantially equal length.

References Cited in the file of this patent

UNITED STATES PATENTS

| | | |
|---|---|---|
| 2,232,530 | Hosking | Feb. 18, 1941 |
| 2,390,026 | Hosking | Nov. 27, 1945 |